US011056108B2

(12) United States Patent
Wu et al.

(10) Patent No.: US 11,056,108 B2
(45) Date of Patent: Jul. 6, 2021

(54) INTERACTIVE METHOD AND DEVICE

(71) Applicant: Alibaba Group Holding Limited, Grand Cayman (KY)

(72) Inventors: Nan Wu, Beijing (CN); Ming Lei, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 126 days.

(21) Appl. No.: 16/171,242

(22) Filed: Oct. 25, 2018

(65) Prior Publication Data

US 2019/0139547 A1 May 9, 2019

(30) Foreign Application Priority Data

Nov. 8, 2017 (CN) .......................... 201711092757.8

(51) Int. Cl.
*G10L 15/22* (2006.01)
*G10L 15/18* (2013.01)
*G06K 9/00* (2006.01)
*G10L 15/25* (2013.01)
*G06F 3/16* (2006.01)

(52) U.S. Cl.
CPC .............. *G10L 15/22* (2013.01); *G06F 3/167* (2013.01); *G06K 9/00228* (2013.01); *G10L 15/1815* (2013.01); *G10L 15/25* (2013.01); *G10L 2015/223* (2013.01)

(58) Field of Classification Search
CPC ........ G06F 3/017; G06F 3/0647; G09F 13/12; H04N 7/14; G10L 15/22; G10L 15/1815; G10L 15/25
See application file for complete search history.

(56) References Cited

U.S. PATENT DOCUMENTS

| 5,983,186 | A | 11/1999 | Miyazawa et al. |
| 6,480,823 | B1 | 11/2002 | Zhao et al. |
| 9,099,098 | B2 | 8/2015 | Atti et al. |
| 9,451,210 | B1* | 9/2016 | Smus .................. G06F 3/04842 |
| 9,916,431 | B2 | 3/2018 | Hwang et al. |
| 10,475,440 | B2 | 11/2019 | Hiroe |
| 10,594,757 | B1* | 3/2020 | Shevchenko ........... G06F 40/35 |
| 2003/0033150 | A1* | 2/2003 | Balan ........................ G01S 5/22 |
| | | | 704/275 |
| 2003/0046557 | A1* | 3/2003 | Miller ..................... G06F 21/41 |
| | | | 713/186 |

(Continued)

OTHER PUBLICATIONS

The PCT Search Report and Written Opinion dated Jan. 28, 2019 for PCT Application No. PCT/US2018/057599, 8 pages.

*Primary Examiner* — Anne L Thomas-Homescu
(74) *Attorney, Agent, or Firm* — Lee & Hayes, P.C.

(57) ABSTRACT

An interactive method and a device thereof are provided. The method includes obtaining voice data of the object in response to determining that the object is facing the interactive device and is in the utterance state; and establishing an interaction between the object and the interactive device based on the voice data. The method solves the technical problems in which current interactions need to set up wakeup terms for interactive devices which are prone to false wakeups through the wakeup terms due to an existence of a relatively small number of wakeup terms. The above methods can implement the technical effects of remote interactions without the need of a wakeup term.

17 Claims, 13 Drawing Sheets

(56) References Cited

U.S. PATENT DOCUMENTS

| | | | |
|---|---|---|---|
| 2004/0252845 A1* | 12/2004 | Tashev | G01S 3/8034 381/56 |
| 2007/0021958 A1 | 1/2007 | Visser et al. | |
| 2007/0027579 A1* | 2/2007 | Suzuki | G05D 1/12 700/245 |
| 2010/0026780 A1* | 2/2010 | Tico | G06T 7/246 348/14.02 |
| 2012/0235790 A1* | 9/2012 | Zhao | H04W 12/06 340/5.83 |
| 2013/0145272 A1* | 6/2013 | Boggie | G06F 3/167 715/728 |
| 2013/0218559 A1 | 8/2013 | Yamabe | |
| 2013/0218575 A1 | 8/2013 | Konishi et al. | |
| 2014/0098133 A1* | 4/2014 | Fein | G06F 3/011 345/633 |
| 2014/0226838 A1* | 8/2014 | Wingate | G10L 21/0272 381/111 |
| 2014/0282275 A1* | 9/2014 | Everitt | G06F 3/017 715/863 |
| 2015/0149169 A1* | 5/2015 | Chang | H04R 25/55 704/235 |
| 2015/0179185 A1* | 6/2015 | Boemer | G10L 21/0208 381/94.1 |
| 2015/0331490 A1 | 11/2015 | Yamada | |
| 2016/0199977 A1 | 7/2016 | Breazeal | |
| 2016/0301791 A1* | 10/2016 | Kim | G06F 3/0481 |
| 2016/0306604 A1* | 10/2016 | Smith | G06F 3/167 |
| 2017/0160813 A1* | 6/2017 | Divakaran | G10L 15/1815 |
| 2017/0165573 A1* | 6/2017 | Froy | A63F 13/426 |
| 2017/0188807 A1* | 7/2017 | Swital | G06Q 30/0635 |
| 2017/0244942 A1* | 8/2017 | Ma | G06F 3/0304 |
| 2018/0033447 A1* | 2/2018 | Ramprashad | G10L 21/0216 |
| 2018/0096507 A1* | 4/2018 | Valdivia | G06F 3/011 |
| 2018/0101988 A1* | 4/2018 | Murillo | G06T 19/006 |
| 2018/0191501 A1* | 7/2018 | Lindemann | G06F 3/0683 |
| 2018/0268747 A1* | 9/2018 | Braun | G06T 19/006 |
| 2018/0374494 A1* | 12/2018 | Yamaya | G06K 9/00523 |
| 2019/0115018 A1* | 4/2019 | Zurek | G10L 15/22 |
| 2019/0122692 A1 | 4/2019 | Binder et al. | |
| 2019/0272029 A1* | 9/2019 | Fein | G06F 3/013 |
| 2020/0005786 A1* | 1/2020 | Saito | G10L 25/63 |
| 2020/0016745 A1* | 1/2020 | Tang | B25J 9/163 |
| 2020/0053558 A1* | 2/2020 | Hallock | H04W 12/06 |

\* cited by examiner

INTERACTIVE METHOD AND DEVICE

CROSS REFERENCE TO RELATED PATENT APPLICATIONS

This application claims priority to Chinese Patent Application No. 201711092757.8, filed on 8 Nov. 2017, entitled "Interactive Method and Device," which is hereby incorporated by reference in its entirety.

TECHNICAL FIELD

The present disclosure relates to the technical field of data processing, and particularly to interactive methods and devices.

BACKGROUND

With the continuous development of speech recognition technologies, more and more voice smart devices have been developed and used. At present, voice interactive modes mainly include a remote voice interactive mode and a near-field manual trigger mode.

The remote voice interactive mode generally wakes up a device through a wakeup term, so that the awaken device can perform voice interaction. For example, as shown in FIG. 1, a wakeup term can be set for a certain device as "Miu miu". As such, when a user says "Miu miu" and is recognized by the device, the device will be woken up, so that the user can perform voice interaction with the device. In this process, the user does not need to perform manual operations.

The manual trigger mode generally has a button or a trigger key set on a device. When a user clicks the button or the key, the device can be triggered to enable a function of voice interaction, so that the user can perform voice interaction with the device.

However, the above-mentioned remote voice interaction mode and the near-field manual trigger mode have problems of different extent. For example, a remote voice is prone to interference from environmental noise, and a false wakeup may occur. The near-field manual trigger mode needs manual triggering every time, and so has inconvenient operations, requiring a user to be close to a device for operations, which is troublesome to use.

No effective solution has been proposed so far for the above problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure aims to provide an interactive method and a device thereof, which can achieve the purpose of conducting voice interaction without the need of a wakeup term to wake up a device.

The present disclosure provides an interactive method and a device thereof that are implemented as follows.

An interactive method includes identifying whether an object is facing an interactive device and is in an utterance state; obtaining voice data of the object in response to determining that the object is facing the interactive device and is in the utterance state; and establishing an interaction between the object and the interactive device based on the voice data.

An interactive method includes identifying whether an object faces an interactive device; establishing an interaction between the object and the interactive device in response to determining that the object faces the interactive device and a time duration of stay exceeds a preset time duration.

An interactive method includes identifying whether an object faces an interactive device; and establishing an interaction between the object and the interactive device in response to determining that the object faces the interactive device.

An interactive device includes a camera, a microphone array, and a processor. The camera is configured to obtain an image. The processor is configured to identify whether an object is facing the interactive device and in an utterance state based on the image. The microphone array is configured to obtain audio data of the object in response to determining that the object is facing the interactive device and in the utterance state. The processor is configured to establish an interaction between the object and the interactive device according to the audio data.

An interactive device includes a camera, a microphone array, and a processor. The camera is configured to obtain an image. The processor is configured to identify whether an object is facing the interactive device and stays for a time duration that exceeds a preset time duration. The microphone array is configured to obtain audio data of the object in response to determining that the object is facing the interactive device and stays for a time duration that exceeds the preset time duration. The processor is configured to establish an interaction between the object and the interactive device according to the audio data.

An interactive device includes a processor and a storage device configured to store processor executable instructions, the processors implementing acts of the above method(s) when executing the instructions.

A computer readable storage media having computer instructions stored thereon, the instructions implementing operations of the above method(s) when being executed.

The interactive methods and devices provided in the present disclosure determines whether a user intends to conduct voice interaction with a device according to whether an object is facing the device, and thereby is able to detect an intent of the user to initiate the interaction in time, thus triggering interactions between a target object and an interactive device. The above methods solve the technical problems in which current interactions need to set up wakeup terms for interactive devices which are prone to false wakeups through the wakeup terms due to an existence of a relatively small number of wakeup terms. The above methods can implement the technical effects of remote interactions without the need of a wakeup term.

BRIEF DESCRIPTION OF THE DRAWINGS

In order to describe technical solutions in the embodiments of the present disclosure or existing technologies more clearly, accompanying drawings that are needed for describing the embodiments are briefly described herein. The drawings described as follows merely represent some embodiments recorded in the present disclosure. One of ordinary skill in the art can also obtain other drawings based on these accompanying drawings without making any creative effort.

DETAILED DESCRIPTION

In order to enable one skilled in the art to understand the technical solutions of the present disclosure in a better manner, the technical solutions of the embodiments of the present disclosure are described clearly and comprehensively in conjunction with the accompanying drawings of the embodiments of the present disclosure. Apparently, the described embodiments represent merely some and not all of the embodiments of the present disclosure. Based on the embodiments in the present disclosure, all other embodiments obtained by one of ordinary skill in the art without making any creative effort should fall in the scope of protection of the present disclosure.

Existing voice interaction approaches based on wakeup terms are considered to be similar to interactions between humans: A calls a name of B, and B knows that A is talking to him/her through this operation of calling the name of B by A, and a voice interaction is thereby triggered. If B is a smart device, a wakeup term, such as a name or an action triggering term, etc., is needed to be set up for such smart device. This requires a user to know the wakeup term for this smart device in advance in order to trigger a voice interaction with the smart device. This is also prone to false wakeups. For example, the user may utter a certain term unconsciously, and this term happens to be the wakeup term for the smart device. However, the user does not intend to wake up the device, and thus a false wakeup occurs.

In view of the need of setting up wakeup terms for existing voice interaction approaches and the problems of the risks of generation of false wakeups, implementing voice conversation may not necessarily need to have a wakeup term after a normal way of interactions between humans is considered. Conversation can be naturally triggered using a face-to-face approach. For example, A faces towards B, uttering by opening his/her mouth or staying for a certain time period, or making a hand gesture for greeting, etc. This can be recognized as A desiring to talk to B. Alternatively, when a user is positioned in front of a certain device, and is speaking with his/her mouth, or staying for a certain period of time, this can also be recognized as a desire of A to use a function provided by the device.

Accordingly, considering that a determination can be made as to whether a user intends to conduct voice interaction with a device if a determination of whether the user is facing the device can be made in conjunction with visual recognition, the voice interaction with the device can be realized without the need of waking up the device.

Figure 1:
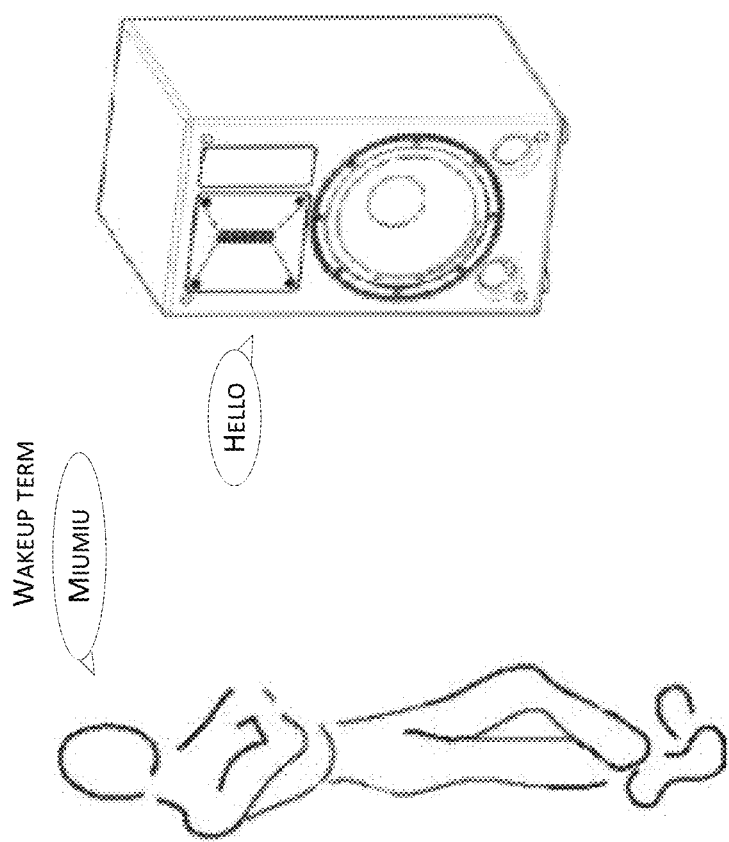
FIG. 1 is a schematic diagram of a remote voice interaction using a wakeup term in the existing technologies.
Figure 2:
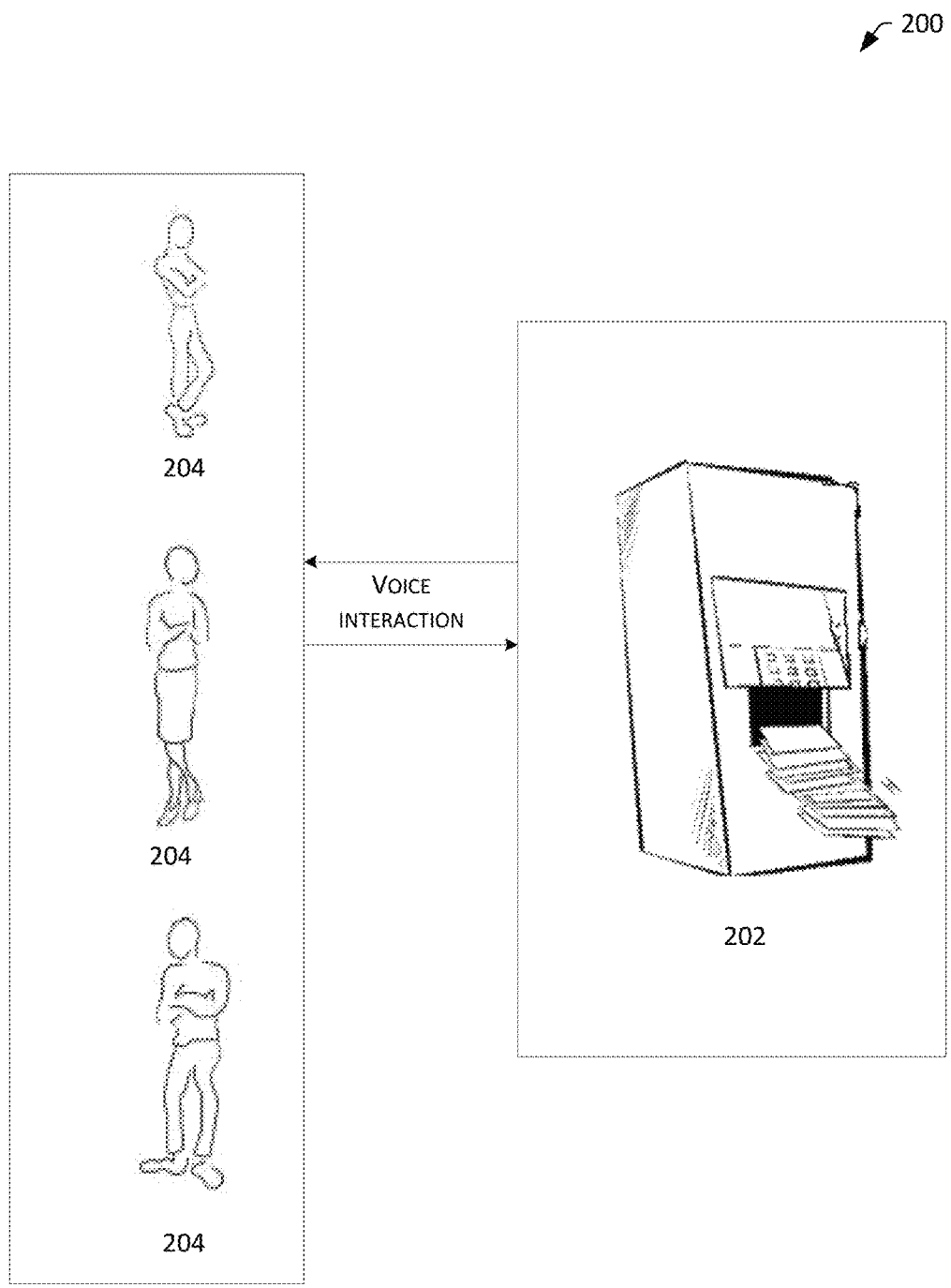
FIG. 2 is a schematic diagram of architecture of a voice interactive system in accordance with the embodiments of the present disclosure.

As shown in FIG. 2, a voice interactive system 200 is provided in this example, which includes one or more interactive devices 202, and one or more users 204.

The above voice device may be, for example, a smart speaker, a chat robot, a robot with a service providing function, or an application installed in a smart device such as a mobile phone or a computer, etc., which the present disclosure does not have any specific limitation on a type of form thereof.

Figure 3:
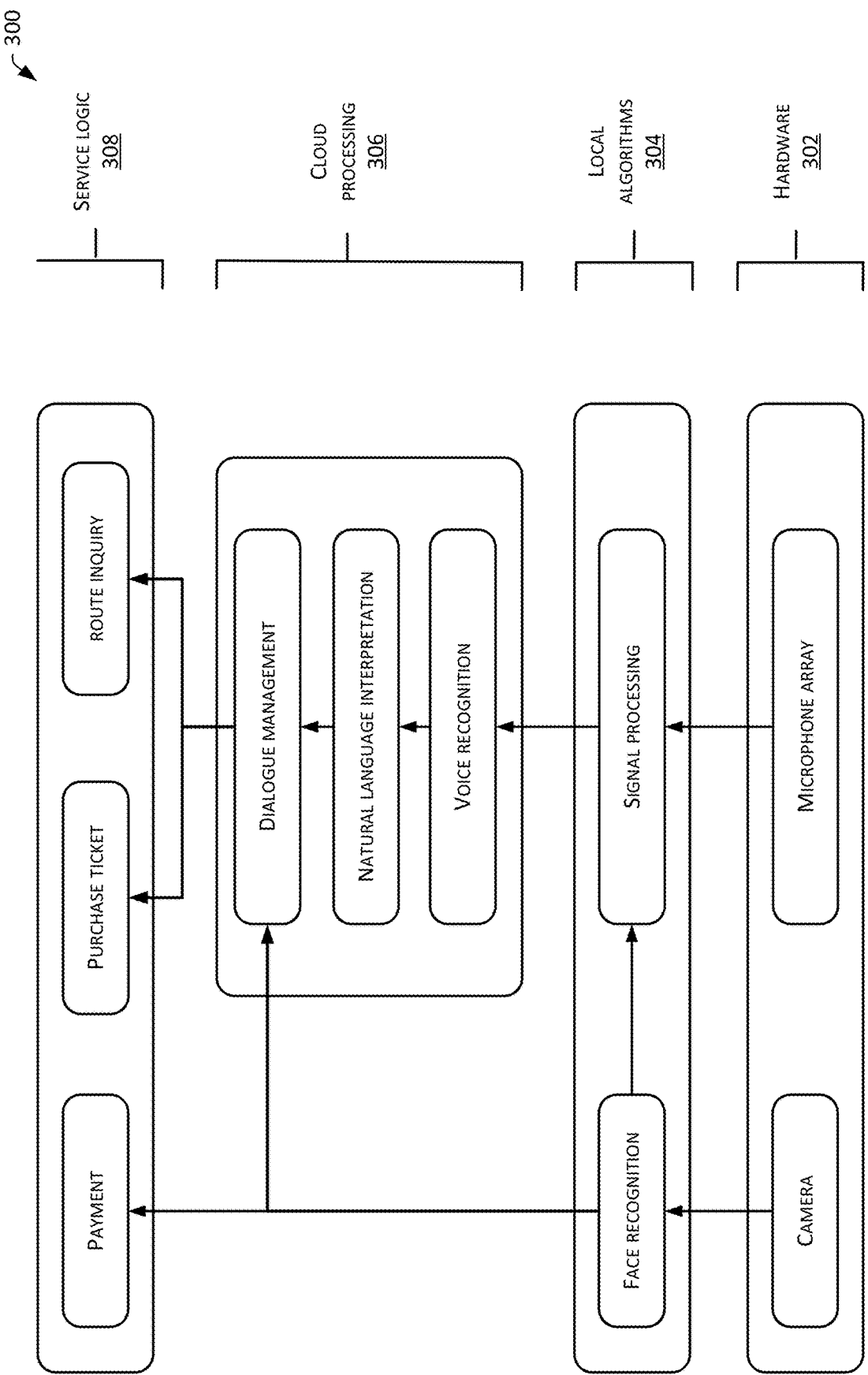
FIG. 3 is a schematic diagram of a logical implementation of a scenario of a human-machine interaction in accordance with the embodiments of the present disclosure.

FIG. 3 is a schematic diagram of a service logic implementation 300 for performing voice interaction based on the voice interactive system 200 of FIG. 2, which may include the following:

1) Hardware 302: a camera and a microphone array may be included.

The camera and the microphone array may be disposed in the voice device 202 as shown in FIG. 2, and portrait information may be obtained by the camera. A position of the mouth may be further determined based on the obtained portrait information, so that a position of a source of sound may be determined. Specifically, the position of the mouth that utters the sound can be determined through the portrait information, thus determining which direction of sound to be the sound that needs to be obtained.

After determining which direction of sound to be the sound that needs to be obtained, directional de-noising can be performed through the microphone array, i.e., the sound in a direction of sound source can be enhanced by the microphone array while suppressing noises in directions different from the direction of sound source.

In other words, directional de-noising can be performed on the sound through cooperation between the camera and the microphone array.

2) Local algorithms 304: an algorithm based on face recognition and an algorithm based on a signal processing may be included.

The algorithm based on face recognition can be used to determine an identity of a user, and can be used to identify locations of facial features of the user. Identifying whether the user is facing the device, and user payment authentication, etc., can be achieved by the camera with a local face recognition algorithm.

The signal processing algorithm may determine an angle of a sound source after a position of the sound source has been determined, and thereby control a sound pickup of the microphone array to achieve a directional noise cancellation.

At the same time, processing such as a certain degree of amplification, filtering and the like can also be performed on the voice that is obtained.

3) Cloud processing 306: cloud implementation or local implementation can be determined according to the processing capabilities of the device and the usage environment, etc. Apparently, if implemented in the cloud, updating and adjusting an algorithmic model can be performed using big data, which can effectively improve the accuracy of voice recognition, natural speech understanding, and dialogue management.

Cloud processing can mainly include voice recognition, natural language understanding, dialogue management, and the like.

Voice recognition mainly recognizes the content of an obtained voice. For example, if a piece of voice data is obtained and a meaning thereof needs to be understood, then specific text content of that piece of voice needs to be known first. Such process needs to convert the voice into a text using voice recognition.

Whether a text or a text itself, a machine needs to determine the meaning represented by the text, and thus needs a natural language interpretation to determine the natural meaning of the text, so that the intent of a user in the voice content and information included therein can be identified.

Because it is a human-computer interaction process, a Q&A session is involved. A dialog management unit can be used. Specifically, a device can actively trigger a question and an answer, and continue to generate question(s) and answer(s) based on a response of a user. These questions and answers require preset questions and answers that are needed. For example, in a dialogue for purchasing a subway ticket, content of questions and answers such as a ticket of which subway station you need, how many tickets, etc., need to be configured, while a user correspondingly needs to provide a name of the station and the number of tickets. The dialog management also needs to provide corresponding processing logic for situations in which a user needs to change a name of a station, or to modify a response that has been submitted, etc.

For dialogue management, not only regular conversations are set, but conversation content can also be customized for users according to differences in identities of the users, thus leading to a better user experience.

A purpose of dialogue management is to achieve effective communications with users and to obtain information that is needed to perform operations.

Specific voice recognition, natural speech understanding and dialogue management can be implemented in a cloud or locally, which can be determined according to the processing capabilities of a device itself and a usage environment. Apparently, if implemented in the cloud, updating and adjusting an algorithmic model can be performed using big data, which can effectively improve the accuracy of voice recognition, natural speech understanding and dialogue management. For various payment scenarios and voice interaction scenarios, an iterative analysis and optimization of a voice processing model can be performed, so that the experience of payment and voice interaction can be made much better.

4) Service logic 308: services that the device can provide.

The services may include, for example, payment, ticket purchase, inquiry, display of query results, etc. Through configurations of hardware, local algorithms, and cloud processing, the device can perform the services that are provided.

For example, for a ticketing device, a user requests to buy a ticket through human-computer interactions using the device, and the device can issue the ticket. For a service consulting device, a user can obtain required information through human-computer interactions using the device. These service scenarios often require a payment. Therefore, a payment process generally exists in the service logic. After a user makes a payment, a corresponding service is provided to the user.

Through the service logic and combining with a "visual+voice" intelligent interaction scheme, noises can be reduced, and the accuracy of recognition can be improved. A two-person conversation scenario can be free from interruption, and the purpose of avoiding a wakeup can be achieved. A user can conduct interactions using a natural voice.

Figure 4:
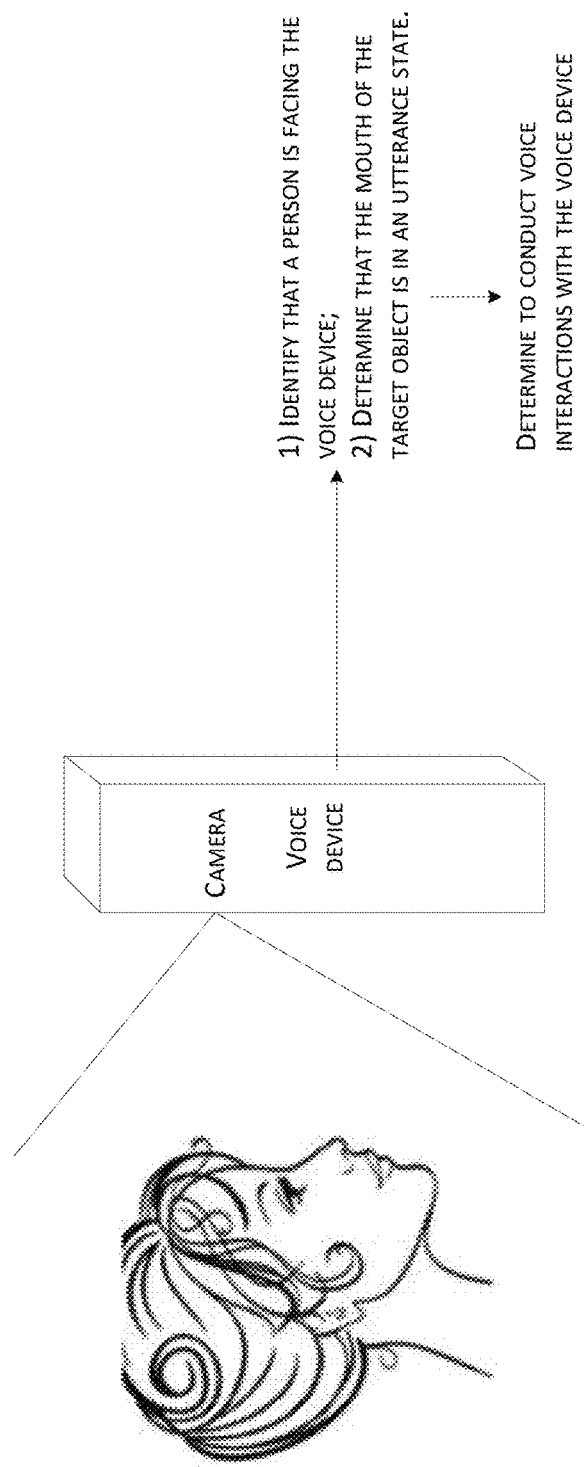
FIG. 4 is a schematic diagram of a determination of whether to establish a voice interaction in accordance with the embodiments of the present disclosure.

In implementations, the voice device is deployed with a camera, and image information of a user can be obtained through the camera. As such, whether the user is facing the device and whether the user is standing in a preset area, or a length of time that the user is facing the device and whether the user speaks, etc., can be determined, as shown in FIG. 4. FIG. 4 is a schematic diagram of a determination 400 of whether to establish a voice interaction in accordance with the embodiments of the present disclosure. In response to determining that the user is facing the device and a time duration is longer than a preset time duration, or the user is facing the device and talking, the user may be considered to have a need to conduct voice interactions with the device.

Figure 5:
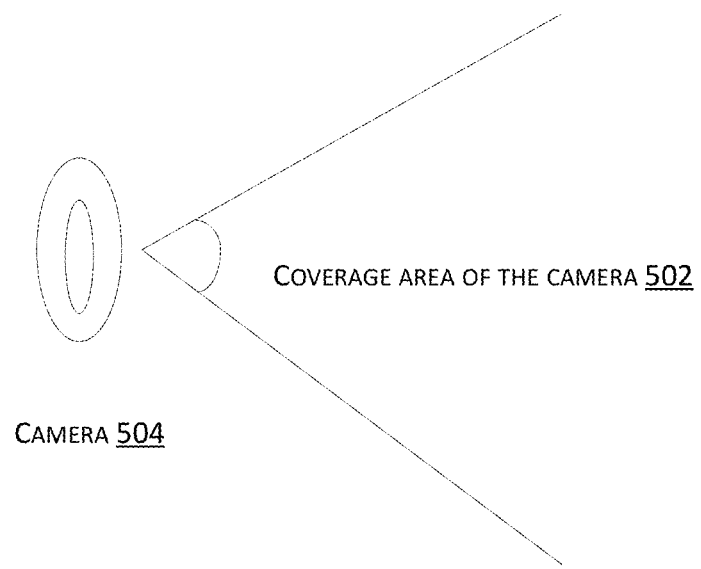
FIG. 5 is a schematic diagram of a scope of coverage of a preset camera in accordance with the embodiments of the present disclosure.

When determining whether the user is facing the device, this can be performed through face recognition, human body recognition, etc. to determine whether the user is facing the device. FIG. 5 is a schematic diagram of a scope of coverage of a preset camera in accordance with the embodiments of the present disclosure. For example, whether a person exists in an area 502 covered by a camera 504 may first be identified as shown in FIG. 5. After determining that a person exists, a determination is made as to whether the person faces the device through face recognition. Specifically, facial features of the person (e.g., eyes, mouth, etc.) can be recognized. If eye(s) is/are recognized, the person can be considered to be facing the device. If the eye(s) is/are not recognized, the person can be considered to be facing away from the device.

However, it is worth noting that the above-mentioned manner of determining whether a person is facing a device through the face recognition technology is only an exemplary description. In practical implementations, other methods for determining whether a person is facing a device may also be used, for example. Other methods of determining whether facing is towards a device may be employed, for example, by combining an infrared detection technology and a voice recognition technology. A person is detected through the infrared detection technology, and then a determination is made as to whether sound is picked up in a direction of the person approaching the device using the voice recognition technology, thereby determining whether someone is facing the device. Specific methods are not limited in the present disclosure, and may be selected according to actual needs and situations.

Further, a preset distance may be set. A determination is first made as to whether a person appears in an area covered by the camera and within a scope of a distance from the device that is less than or equal to the preset distance. If a person appears within the preset distance, a determination is made as to whether the person is facing the device. For example, infrared recognition, human body sensing sensor, radar detection, etc. can be used to identify whether a person appears within a preset distance. Only after determining that a person exists is the subsequent recognition triggered to identify whether the person is facing the device. This is mainly because a user is far away from the device in some occasions and the user does not generally intend to conduct a voice interaction with the device even if the user is speaking and facing towards the device at that time. Furthermore, an excessive long distance will led to a decrease in the accuracy of voice recognition, and so a preset distance limit can be set to ensure the accuracy of recognition.

However, it is worth noting that the above-mentioned manner of identifying whether a person is present is only an exemplary description. In practical implementations, other methods may be used, such as a ground pressure sensor, etc., which are not limited in the present disclosure. Methods of recognizing the presence of a person can be applied to identify whether a person appears herein. Specifically, which method is used can be selected according to actual needs, which is not limited in the present disclosure.

Figure 6:
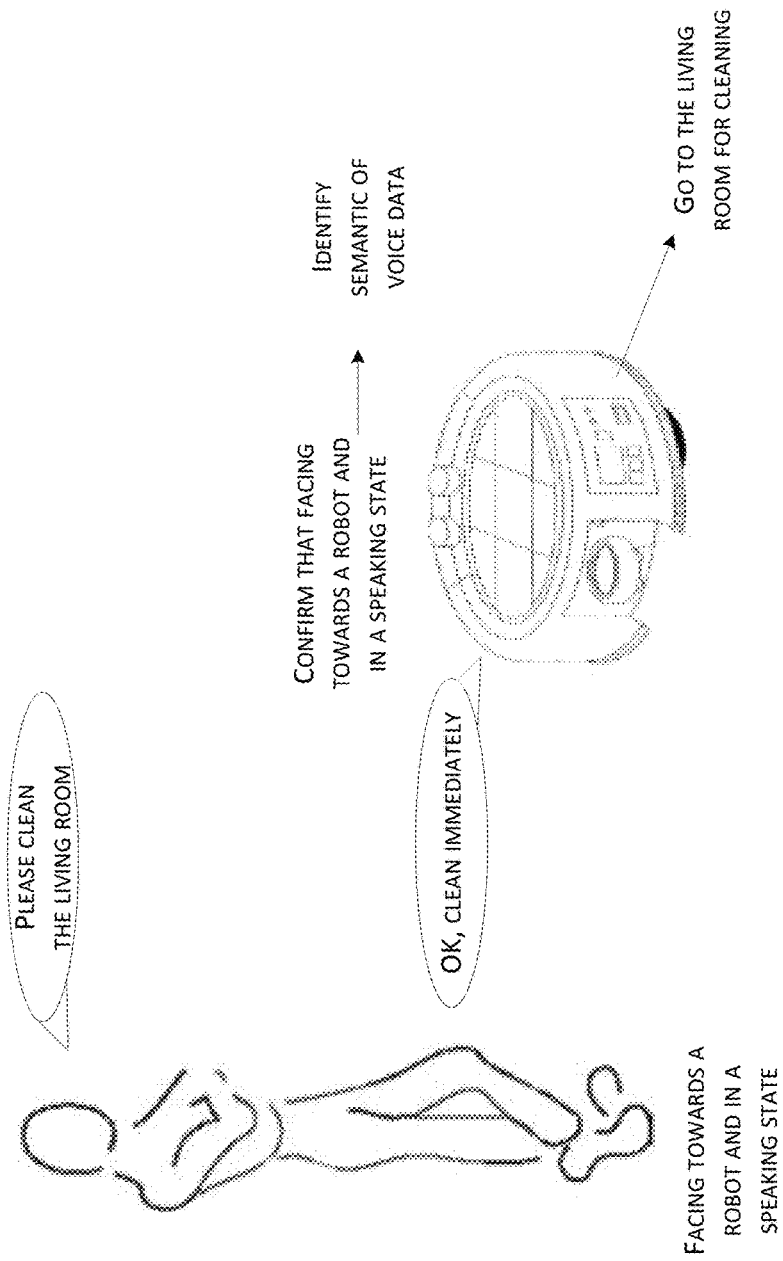
FIG. 6 is a schematic diagram of a voice interaction in accordance with the embodiments of the present disclosure.

In order to improve the accuracy of determining whether a user is speaking, a multi-angle, multi-directional camera can be deployed to monitor the user to determine whether the user is speaking. In implementations, considering that a user is facing towards the device in some occasions and talking, the user, however, does not actually attempt to conduct a voice interaction with the device, perhaps having a conversation with another person, or just talking to himself/herself. For example, if a certain smart device is only a device that a user actively triggers to sweep the floor. In this case, if people conduct voice interaction with the device, this would be relevant to cleaning, or simply saying hello. FIG. 6 is a schematic diagram of a voice interaction 600 in accordance with the embodiments of the present disclosure. For example, as shown in FIG. 6, the content of a voice of a user is "please cleaning the living room". The device can then trigger an acquisition of the user's voice data, and identify the voice content is "please clean the living room" from the voice data in response to determining that the user faces thereto and the mouth is talking. A semantic analysis of the content can determine that the content is relevant to the smart device, and the device can respond accordingly. For example, an answer of "OK, clean immediately" can be given, and the device can perform an operation of cleaning of the living room.

If the user is facing the device and says, "I will read the book for a while, and order a takeaway." At this time, although the user is identified as facing the device and opening the mouth for talking, after performing a semantic analysis of the recognized content is "I will read the book for a To read the book, and then take a takeaway" the content is determined to be not relevant to the device. As such, the device does not need to perform any response.

Voice content of a user that is obtained can be semantically analyzed, such that a corresponding response is made only when the device is relevant thereto, and no response can be made if being not relevant to the device, the user is considered to be not establishing a voice interaction with the device. In this way, sound interference can be effectively avoided in a noisy environment.

In order to ensure the validity of voice interaction, voice data of a user may be obtained in response to determining that the user faces the device and is speaking through the mouth, or a time duration of the user facing the device exceeds a preset time duration. The data is semantically analyzed to determine whether the voice content is relevant to the device, and a final determination is made that the user is conducting a voice interaction with the device only after determining the voice content is relevant to the device, instead of determining that the user is conducting a voice interaction with the device as long as the user is facing the device and is talking through the mouth. In this way, misjudgment of voice interaction can be effectively avoided.

In implementations, taking into account that the normal life scene is generally noisy, the voice of the user that is received may be subjected to noise reduction processing in order to make the obtained voice data to be clear and accurate. Furthermore, in order to identify the meaning of the voice of the user to enable the device to make a corresponding responsive operation, the obtained voice of the user can be converted into text content, and a semantic analysis is performed thereon using a semantic understanding module to determine the content that is expressed by the voice of the user.

When the semantic analysis is performed, responsive operations corresponding to different semantic contents may be preset or trained in advance. Once a matching semantic content corresponding thereto is found, a responsive operation corresponding to the semantic content is used as a response. The response may be in a form of voice conversation or may be an execution of a certain action. For example, after triggering a voice interaction, a user asks a device responsible for questions and answers: how is the weather today. The device can check the current weather through a weather website, and finds that, for example, the weather is cloudy: 18 to 26° C. The device may then respond that Today's weather is: cloudy, 18 to 26° C. In implementations, question-and-answer content may be presented in a form of a voice or displayed on a display. Alternatively, for smart devices, for example, an intelligent vending machine, a user establishes a voice interaction therewith: I want a can of XX mineral water. The vending machine obtains and determines from the voice through a semantic analysis that the user wants a bottle of XX mineral water. The vending machine may automatically discharge a bottle of XX mineral water.

In implementations, a smart device can perform a voice interaction with a user, and determine an operation that needs to be performed by parsing the semantic content in the voice of the user, thereby satisfying the needs of the user.

In implementations, the voice of a user can be received through a microphone array, that is, the microphone array can be set in a device for receiving the voice of the user, or the voice of the user can be received by activating the preset microphone array in the device.

In implementations, the voice interactive system may further include a server. The voice device communicates with the server. The voice server can process the received voice of the user therein. Alternatively, the received voice of the user can be transmitted to the server and processed by the server to generate a control command. The voice device is controlled to execute a voice response or perform a preset operation, etc., through the generated control command. Specifically, the process (i.e., determining whether to initiate a voice interaction and to identify the semantic of the voice of the user) may be implemented by the voice device itself or by the server, which is not limited in the present disclosure.

The above-mentioned voice interactive system can be applied to places and devices that can use voice for interactions, such as in a home, a conference hall, a car, an exhibition hall, a subway station, a railway station, etc., and can effectively enhance the interactive experience of users.

The above is configured in order to achieve the purpose of remote voice interaction without using a wakeup term. In practical implementations, the method can be implemented in combination with a remote speech interactive method that is based on a wakeup term. In other words, a device can use both of these methods to perform a wakeup at the same time. Specifically, a user can wake up the device using a wakeup term, or can wake up the device through the combined computer vision that is mentioned above, thereby implementing voice interactions with the device. At the same time, a wakeup trigger button can also be set on the device, so that a near-field-based voice interaction can be realized.

The above voice interactive method will be described hereinafter in conjunction with a particular use scenario, and the method is used in a subway ticket vending machine of a subway as an example.

Figure 7:
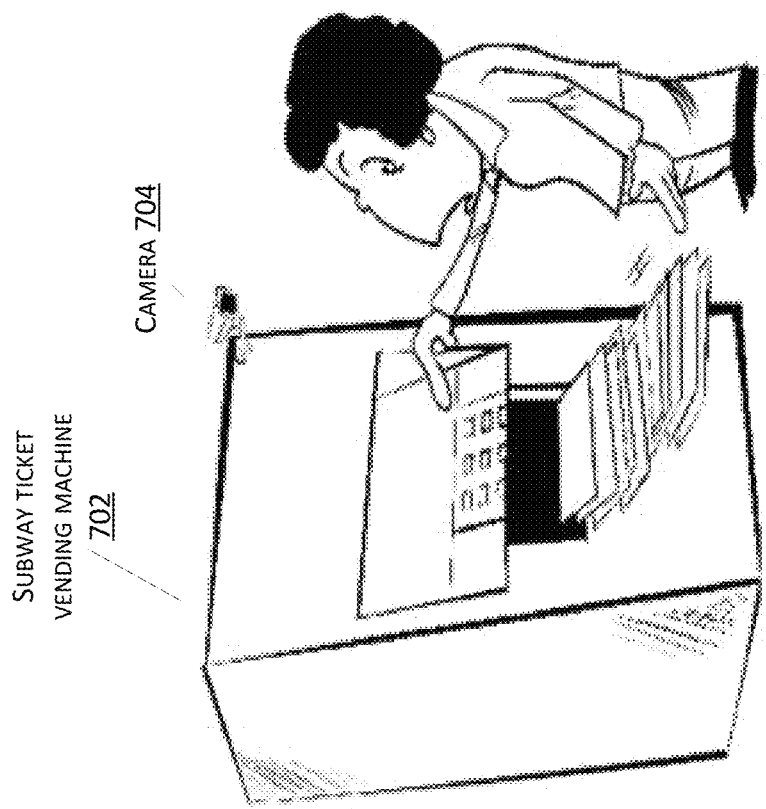
FIG. 7 is a schematic diagram of a ticket purchase scenario of interactions in accordance with the embodiments of the present disclosure.

As shown in FIG. 7, a ticket vending machine 702 of the subway can be provided with a camera 704. Monitoring of whether someone is facing the ticket vending machine is made in real time through the camera. As such, a voice interaction can be established with such user. For example, processing may be, but not limited to, based on one of the following scenarios:

Scenario 1:

If someone is facing the ticket vending machine and speaking, voice data of such user can be directly obtained in this case, and semantic analysis can be performed to determine whether the user's voice content is voice content associated with a desire of buying a ticket. If affirmative, a voice interaction can be established proactively with the user.

For example, the user said "I want to buy a subway ticket from Qinghe to Suzhou Street". After recognizing the voice, the ticket vending machine can identify a "destination station" therefrom, but does not know an exact number of tickets. The ticket vending machine can ask the user again: "How many subway tickets do you need". After these conditions are met, the user can be reminded to make a payment for confirmation and issue the ticket(s).

For another example, in response to identifying that someone is facing the ticket vending machine and speaks, such user may be guided by voice or video to purchase a ticket, for example, or the ticket vending machine may actively ask "Hello, where do you need to buy a subway ticket for". In this way, ticket purchase information that is required is obtained. After all the purchase ticket information is actively inquired, the user can be reminded to make a payment for confirmation, thereby issuing the ticket.

Scenario 2:

A person is detected to be facing the ticket vending machine, and a time duration of the person facing the ticket vending machine is determined. When the time duration reaches a preset duration, a determination can be made that such user intends to purchase a ticket.

At this time, an establishment of voice interaction with the user can be triggered. For example, the user can be guided by voice or video to purchase a ticket, for example. Alternatively, the ticket vending machine may actively ask "Hello, where do you need to buy a subway ticket for". In this way, ticket purchase information that is required is obtained. After all the purchase ticket information is actively inquired, the user can be reminded to make a payment for confirmation, thereby issuing the ticket.

However, further taking into account of such relatively noisy environment as a subway station that has a lot of people, voice data can be obtained through directional denoising when obtaining the voice data. If a large number of people are identified to satisfy preset conditions for establishing a voice interaction, a user who is facing towards the ticket vending machine and is at the shortest linear distance from the ticket vending machine can be selected as a user who establishes a voice interaction, thereby avoiding difficulties of deciding which user to establish a voice interaction with in an situation that includes multiple users.

It is worth noting that the above is only an example of application in a subway station for illustration. The method can also be applied to other smart devices, such as household sweeping robots, self-service shops, consulting devices, railway stations, self-service vending machines, etc. Particular scenarios are not specifically limited by the present disclosure, and may be selected and configured according to actual needs.

Figure 8:
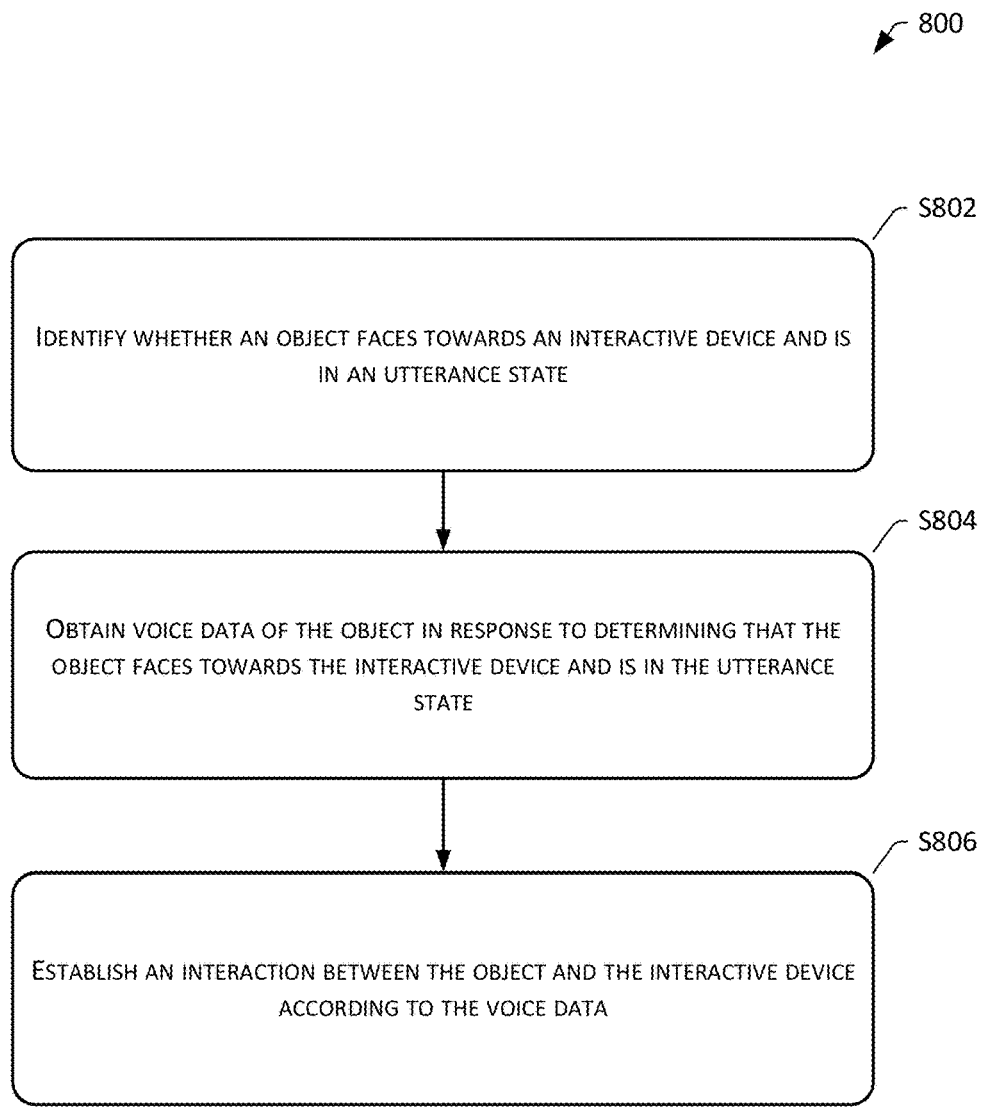
FIG. 8 is a flowchart of an interactive method in accordance with the embodiments of the present disclosure.

FIG. 8 is a flowchart of a method embodiment of a voice interactive method according to the present disclosure. Although the present disclosure provides operations of methods or structures of apparatuses as shown in the following embodiments or figures, more or fewer operations or modules and units may be included in the methods or apparatuses based on conventional or non-inventive effort. In operations or structures in which no necessary causal relationship logically exists, orders of execution of the operations or modular structures of the apparatuses are not limited to orders of execution or modular structures described in the embodiments of the present disclosure and shown in the drawings. When an apparatus or a terminal product of the method or modular structure is applied in practice, an execution may be performed according to connections and an order of the method or modular structure as shown in the embodiment or the figure or in parallel (for example, a parallel processor or a multi-thread processing environment, or even a distributed processing environment).

Specifically, as shown in FIG. 8, an interactive method 800 provided by an embodiment of the present disclosure may include:

S802: Identify whether an object faces towards an interactive device and is in an utterance state.

In implementations, the interactive device may monitor in real time to determine whether an object appears within a preset area of scope through a camera. For example, whether an object appears in a preset area of scope can be determined by means of infrared sensing or object recognition, etc. In response to determining that an object appears, an acquisition of image data of the object is then triggered, and a determination is further made as to whether the object faces towards the device. If determined to be facing towards the device, a determination may further be made as to whether the object is in an utterance state.

When determining that the user is facing towards the device and in the utterance state, a determination is made that the user is interacting with the device. At this time, an acquisition of voice data can be triggered.

Specifically, when performing object recognition, an object monitoring may be performed in real time for the scope of coverage of a camera of the interactive device. When an object is detected in the scope of coverage, face recognition is performed on the detected object. A determination is made as to whether the object faces the interactive device and is in an utterance state according to a result of the face recognition. Performing the face recognition on the detected object may include determining whether the detected object is in an utterance state by detecting feature points of a mouth on the detected object.

S804: Obtain voice data of the object in response to determining that the object faces towards the interactive device and is in the utterance state.

When voice data is obtained, the voice data can be obtained through a microphone array, and the voice data obtained through the microphone array can be denoised to obtain clearer and less noisy voice data.

S806: Establish an interaction between the object and the interactive device according to the voice data.

Figure 9:
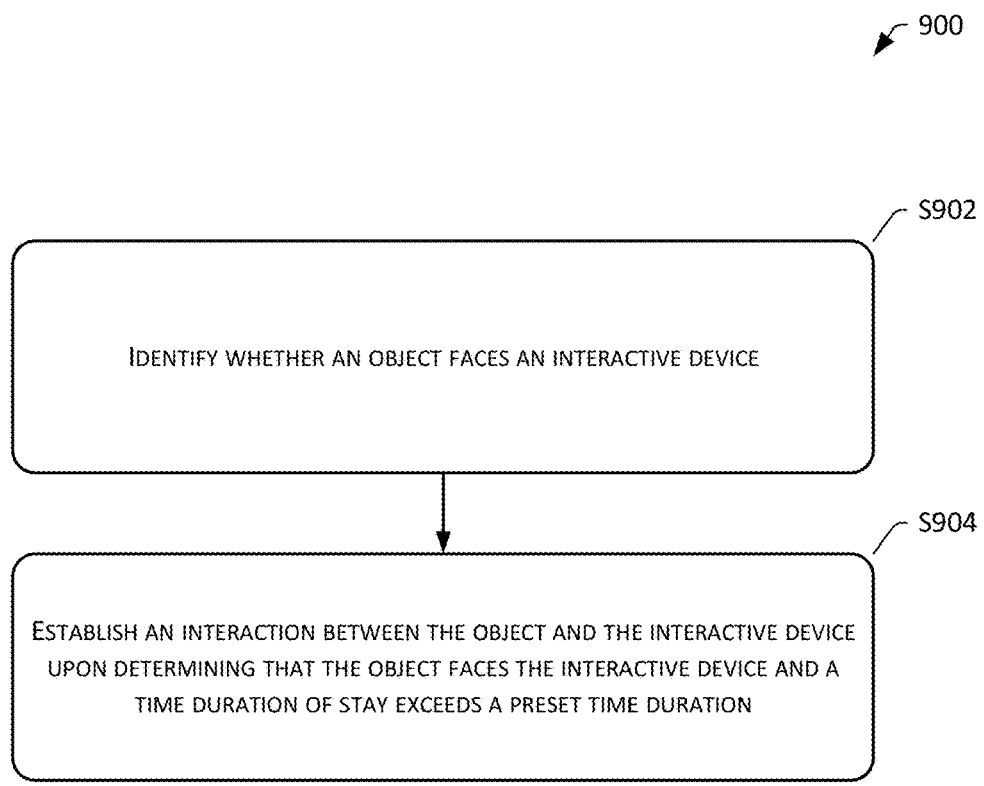
FIG. 9 is a flowchart of another interactive method in accordance with the embodiments of the present disclosure.

FIG. 7 illustrates a description using an example of facing towards a device with mouth being opened for speaking. In implementations, an interaction may be triggered with facing towards the device and a time duration of stay reaching a preset time duration as a trigger condition. Based on thereupon, an interactive method 900 is provided as shown in FIG. 9, which may include:

S902: Identify whether an object faces an interactive device.

Specifically, when performing object recognition, object monitoring may be performed in real time for the scope of coverage of a camera of an interactive device. When an object in the scope of coverage is detected, face recognition is performed on the detected object in order to determine whether the detected object is facing the interactive device.

In implementations, detection of whether an object exists within a preset scope can be performed using a sensor disposed in an area of the preset scope. Detection of whether an object exists within a preset scope can be performed using an infrared detector. Alternatively, detection of whether an object exists within a preset scope can be performed using image information obtained by a camera. In implementations, a particular method can be selected according to actual needs, which is not limited in the present disclosure. Whether the detected object is facing the interactive device can be determined using face recognition.

S904: Establish an interaction between the object and the interactive device upon determining that the object faces the interactive device and a time duration of stay exceeds a preset time duration.

During implementation, considering that words uttered by some persons are irrelevant to the device and do not require the device to reply or respond, voice data may be semantically analyzed. Whether the voice data is relevant to the interactive device can be determined based on a semantic analysis result. A voice interaction is established between the human and the interactive device only when a relation is affirmed.

In implementations, the voice data may be semantically analyzed to match operation instruction(s) that match(es) the semantic analysis result, and the interactive device is controlled according to the operation instruction(s). The above instruction(s) may include, but is not limited to, at least one of the following: a voice response, an interface display, and an execution of action. For example, a voice response may be made to the voice data of the user. Alternatively, some operations may be performed in response to the user's voice data. Alternatively, the user may wish to search or query something, a query or a search result may be displayed on an interface, etc. These can all be implemented in the above manner.

A particular scenario is taken as an example. A smart speaker is set in the living room. User A walks into the speaker and faces the speaker, saying "please play a song 'I want to fly' for me". In response to confirming that user A is facing thereto and is an utterance state, the speaker obtains voice content of "I want to fly" that said by the user A, and then can semantically analyze the voice content to determine that user A wants to play the song "I want to fly". Accordingly, the speaker can reply "OK" in response to such instruction, and then play "I want to fly."

After wakeup, a valid wakeup time, for example, five minutes, may be considered to be set. If user A has no further instruction or response within five minutes, the device is woken up to implement remote voice interactions after confirming again that the above conditions of facing towards the device and being in the utterance state are met, next time when the user A speaks. User A can directly interact with the speaker during the wakeup time. For example, after the song is played, user A feels that the volume is too high, and can say that "the volume is too high, reduce by 25%", and the speaker can lower the volume in response to this instruction.

The above refers to determining whether to trigger an establishment of a voice interaction based on whether a human is facing a device in combination with whether the human speaks or in combination with a time duration of stay. In implementations, determining whether a person is facing the device only may be used as a trigger determination condition. In the words, once the person is found to be facing the device, a voice interaction can be triggered. The reason why the above combination with speaking occurs, or the above combination with the time duration of stay is to make a determination result to be more accurate and more in line with people's actual needs. Apparently, an additional determination condition is not limited to whether speaking occurs and the time duration of stay, and other conditions may be combined for determination, and may be selected according to actual needs and actual use scenarios, which are not limited in the present disclosure.

In another particular scenario, a self-service counter machine of a bank is taken as an example. The self-service counter machine has a voice interaction function. In order to achieve the purpose of waking up without using wakeup terms, the above wakeup method can be set for the self-service counter machine. For example, in response to detecting that a user is close to the counter machine facing the counter machine and in a talking state, a determination can be made that the user is going to have a voice interaction with the counter machine. At this time, the user's voice data can be obtained and semantically recognized. The user said that "the weather is good today and the scenery is good everywhere", i.e., the user is actually singing. A semantic analysis is performed on such content, and determines that the content said by the user is irrelevant to the counter machine. Therefore, no response can be made. For another example, if detecting that the user says that "I want to apply for a new bank card, what should I do". Through a semantic analysis, such voice content is determined to be relevant to the counter machine, and the counter machine can reply, for example, telling the user how to apply for the card, or can answer "OK, please see operational steps displayed on my display screen, and follow the steps to apply for the card" and display details of the operational steps on the display screen.

Dialogues in different inquiry scenarios when a subway ticket is purchased are used as examples.

Dialogue 1 (a Fast Ticket Purchasing Process):

A user walks to the front of a ticket vending machine of Shanghai Railway Station. A camera of the ticket vending machine captures that a person is facing towards the device, and a time duration of stay exceeds a preset duration. A determination can be made that the user is intended to use the device to purchase a ticket. At this time, the ticket vending machine can actively trigger a process of purchasing a ticket, and inquiry the user, thus eliminating the need to be woken up by the user and avoiding a learning process on the device by the user. For example, Ticket vending machine: Hello, please tell me your destination and number of tickets. (this greeting and question-and-answer approach can be pre-configured by dialogue management).

User: I want a ticket to People's Square.

After obtaining "I want a ticket to People's Square" submitted by the user, the ticket vending machine can recognize voice data. First, voice recognition is performed, and the content carried by the voice is recognized. Semantic recognition is then performed to recognize the intent of this piece of voice and information carried therein. Further, the recognized content can be sent to the dialog management, and the dialog management determines that information about the "destination" and the "number of tickets" has been carried therein, and therefore can determine that information required for making a ticket purchase has been satisfied. Accordingly, the next conversation content can be determined to be telling the user an amount that needs to be paid.

The ticket vending machine can display or voice broadcast: (ticket details) a total of 5 dollars, please scan the code to pay.

The user pays the fare through a response APP scan code such as Alipay, etc. After confirming that the fare has been paid, the ticket vending machine can execute a ticket issuing process and issue a subway ticket to People's Square.

Dialogue 2 (a Ticket Purchasing Process that Requires an Injury about the Number of Tickets):

A user walks to the front of a ticket vending machine of Shanghai Railway Station. A camera of the ticket vending machine captures that a person is facing the device, and a time duration of stay exceeds a preset duration. A determination can be made that the user is intended to use the device to purchase a ticket. At this time, the ticket vending machine can actively trigger a ticket purchasing process, and ask the user, thus eliminating the need to be woken up by the user and avoiding a learning process on the device by the user. For example, Ticket vending machine: Hello, please tell me your destination and number of tickets.

User: I want to go to People's Square.

After obtaining "I want to go to People's Square" submitted by the user, the ticket vending machine can recognize voice data. First, voice recognition is performed, and the content carried by the voice is recognized. Semantic recognition is then performed to recognize the intent of this piece of voice and information carried therein. Further, the recognized content can be sent to the dialog management, and the dialog management determines that only information about the "destination" is carried, and information about the "number of tickets" is still missing. Therefore, the dialog management can be invoked to generate the next question, asking the user for the number of tickets needed.

Ticket vending machine: The fare to People's Square is 5 dollars, how many tickets do you want to buy?

User: 2 tickets.

After obtaining "2 tickets" submitted by the user, the ticket vending machine can recognize voice data. First, voice recognition is performed, and the content carried by the voice is recognized. Semantic recognition is then performed to recognize the intent of this piece of voice and information carried therein. Further, the recognized content can be sent to the dialog management, and the dialog management determines that two pieces of information, namely, the "destination" and the "number of tickets", have appeared, and therefore can determine that information required for making a ticket purchase has been satisfied. Accordingly, the next conversation content can be determined to be telling the user an amount that needs to be paid.

Ticket vending machine: (show ticket details) a total of 10 dollars, please scan the code to pay.

The user pays the fare through a response APP scan code such as Alipay, etc. After confirming that the fare has been paid, the ticket vending machine can execute a ticket issuing process and issue 2 subway tickets to People's Square.

Dialogue 3 (a Ticket Purchasing Process with Interrupted Dialogue):

A user walks to the front of a ticket vending machine of Shanghai Railway Station. A camera of the ticket vending machine captures that a person is facing the device, and a time duration of stay exceeds a preset duration. A determination can be made that the user is intended to use the device to purchase a ticket. At this time, the ticket vending machine can actively trigger a ticket purchasing process, and ask the user, thus eliminating the need to be woken up by the user and avoiding a learning process on the device by the user. For example, Ticket vending machine: Hello, please tell me your destination and number of tickets.

User: I want to go to People's Square.

After obtaining "I want to go to People's Square" submitted by the user, the ticket vending machine can recognize voice data. First, voice recognition is performed, and the content carried by the voice is recognized. Semantic recognition is then performed to recognize the intent of this piece of voice and information carried therein. Further, the recognized content can be sent to the dialog management, and the dialog management determines that only information about the "destination" is carried in the voice information, and information about the "number of tickets" is still missing. Therefore, the dialog management can be invoked to generate the next question, asking the user for the number of tickets needed.

Ticket vending machine: The fare to People's Square is 5 dollars, how many tickets do you want to buy?

User: No, I would like to go to Shaanxi South Road instead.

After obtaining "No, I would like to go to Shaanxi South Road instead" submitted by the user, the ticket vending machine can recognize voice data. First, voice recognition is performed, and content carried in the voice is recognized. Semantic recognition is then performed to recognize that the intent of the voice and information carried herein is not about the number of tickets, but a modification of the destination. Therefore, it is determined that the user wants to go not to Shaanxi South Road instead of People's Square. As such, the destination can be modified to "Shaanxi South Road". Further, the recognized content can be sent to the dialog management. The dialog management determines that only destination information is present, and information about the "number of tickets" is still missing. Therefore, the dialog management can be invoked to generate the next question to the user, asking the number of tickets required.

Ticket vending machine: Ok, the fare to Shaanxi South Road is 6 dollars. How many tickets do you want to buy?

User: 2 tickets.

After obtaining "2 tickets" submitted by the user, the ticket vending machine can recognize voice data. First, voice recognition is performed, and the content carried by the voice is recognized. Semantic recognition is then performed to recognize the intent of this piece of voice and information carried therein. Further, the recognized content can be sent to the dialog management, and the dialog management determines that two pieces of information, namely, the "destination" and the "number of tickets", have appeared, and therefore can determine that information required for making a ticket purchase has been satisfied. Accordingly, the next conversation content can be determined to be telling the user an amount that needs to be paid.

Ticket vending machine: (show ticket details) a total of 10 dollars, please scan the code to pay.

The user pays the fare through a response APP scan code such as Alipay, etc. After confirming that the fare has been paid, the ticket vending machine can execute a ticket issuing process and issue 2 subway tickets to Shaanxi South Road.

Dialogue 4 (Recommendations for Lines and Subway Lines):

A user walks to the front of a ticket vending machine of Shanghai Railway Station. A camera of the ticket vending machine captures that a person is facing the device, and a time duration of stay exceeds a preset duration. A determination can be made that the user is intended to use the device to purchase a ticket. At this time, the ticket vending machine can actively trigger a ticket purchasing process, and ask the user, thus eliminating the need to be woken up by the user and avoiding a learning process on the device by the user. For example, Ticket vending machine: Hello, please tell me your destination and number of tickets.

User: I want to go to Metro Hengtong Building.

After obtaining the "I want to go to Metro Hengtong Building" submitted by the user, the ticket vending machine can recognize voice data. First, voice recognition is performed, and the content carried by the voice is recognized. Semantic recognition is then performed to recognize the intent of this piece of voice and information carried therein. Further, the recognized content can be sent to the dialog management, and the dialog management determines that the "destination" information has been carried therein. Conversation content of a route notification is configured in the dialog management module. After the destination is obtained, route information corresponding to the destination can be matched and given to the user. Therefore, subway buffer information that is determined can be provided to the user in a form of a dialogue or an information display, for example:

Ticket vending machine: (showing a target map) You are recommended to take Line Number 1, get off at Hanzhong Road Station, and take exit 2.

User: Ok, buy one ticket.

The ticket vending machine can recognize voice data. First, voice recognition is performed, and the content carried by the voice is recognized. Semantic recognition is then performed to recognize the intent of this piece of voice and information carried therein. Further, the recognized content can be sent to the dialog management, and the dialog management determines that two pieces of information, namely, the "destination" and the "number of tickets", have appeared, and therefore can determine that information required for making a ticket purchase has been satisfied. Accordingly, the next conversation content can be determined to be telling the user an amount that needs to be paid.

Ticket vending machine: (show ticket details) a total of 5 dollars, please scan the code to pay.

The user pays the fare through a response APP scan code such as Alipay, etc. After confirming that the fare has been paid, the ticket vending machine can execute a ticket issuing process and issue one ticket to Hengtong Building.

It is worth noting that the above description is only an exemplary description of dialogues in scenarios. Other dialogue modes and processes may be adopted in practical implementations, which are not limited in the present disclosure.

In the above examples, whether a user has the intent to conduct voice interactions with a device is determined by whether a human body is facing the device, so that the desire of the user to initiate a voice interaction can be detected in time, thereby triggering voice interactions between the target human body and the interactive device. The above-mentioned approach solves the technical problems of existing voice interactions which are prone to unintentional wakeups and need to have wakeup terms set up for an interactive device while the number of wakeup terms for performing wakeups is relatively small. As such, the technical effects of remote voice interactions can be realized without the need of a wakeup term.

Figure 10:
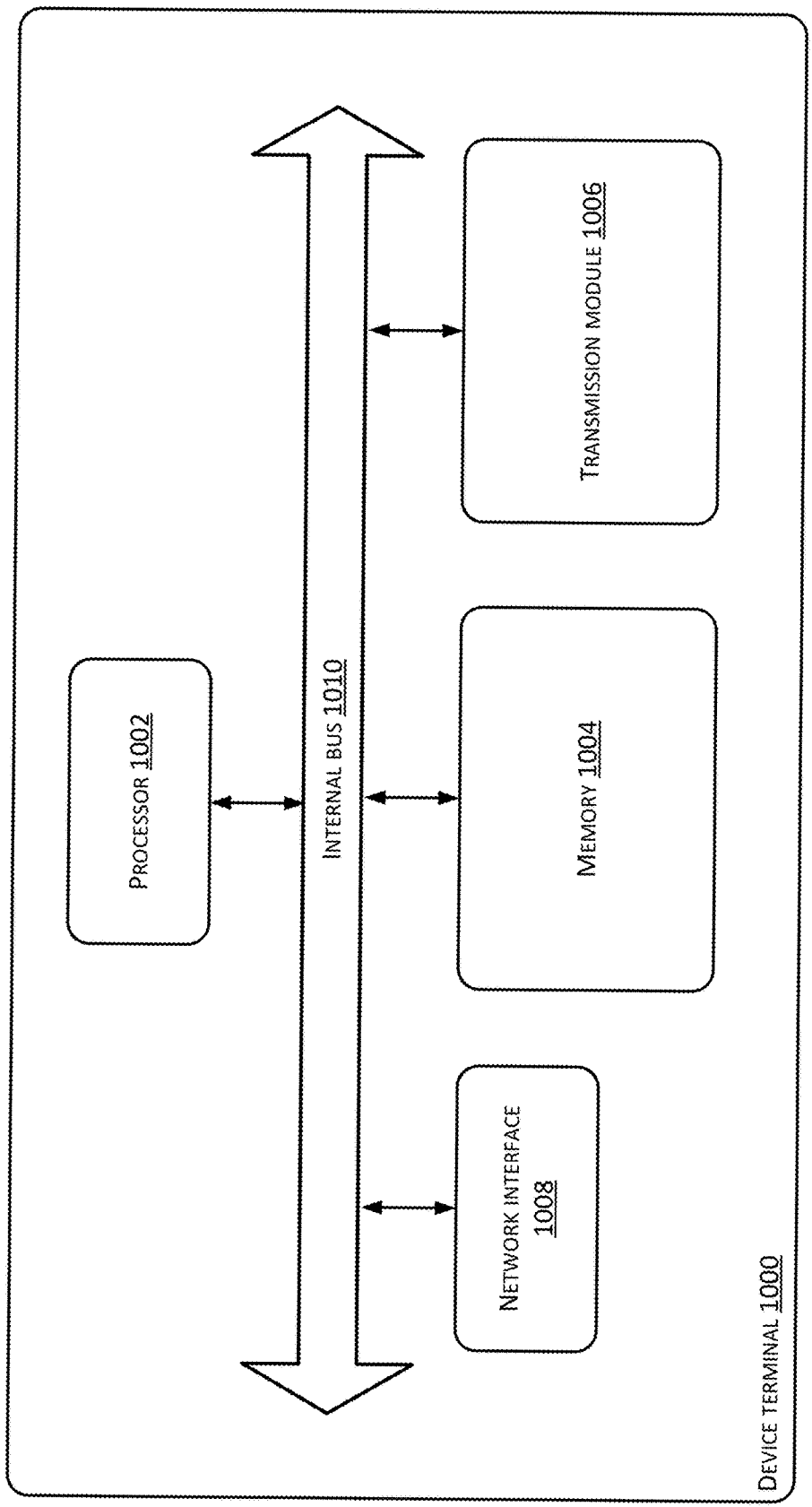
FIG. 10 is a schematic structural diagram of a terminal device in accordance with the embodiments of the present disclosure.

The method embodiments provided by the present disclosure can be implemented in a mobile terminal, a computer terminal, a computing apparatus, or the like. A computer terminal is used as an example. FIG. 10 is a structural block diagram of hardware of a device terminal 1000 for an interactive method according to the embodiments of the present disclosure. As shown in FIG. 10, a device terminal 1000 may include one or more (only one of which is shown in the figure) processors 1002 (the processor 1002 may include, but is not limited to, a processing device such as a microprocessor (MCU) or a programmable logic device (FPGA)), memory 1004 used for storing data, and a transmission module 1006 used for communication functions. In implementations, the device terminal 1000 may further include a network interface 1008 used for connecting the device terminal 1000 to one or more networks such as the Internet, and an internal bus 1010 connecting different components (such as the processor 1002, the memory 1004, the transmission module 1006, and the network interface 1008) with one another. One skilled in the art can understand that the structure shown in FIG. 10 is merely illustrative and does not have any limitations on a structure of the above electronic device. For example, the device terminal 1000 may also include more or fewer components than the ones shown in FIG. 10, or have a different configuration than the one shown in FIG. 10.

The memory 1004 can be configured to store software programs and modules of application software, such as program instructions/modules corresponding to the data interactive method(s) in the embodiment(s) of the present disclosure. The processor 1002 executes various functions, applications and data processing by running software program(s) and module(s) stored in the memory 1004, i.e., implementing the data interactive method(s) of the above application program(s). The memory 1004 may include high speed random access memory and may also include non-volatile memory such as one or more magnetic storage devices, flash memory, or other non-volatile solid-state memory. In some examples, the memory 1004 may further include storage devices that are remotely located relative to the processor 1002. These storage devices may be coupled to the computer terminal 1000 via a network. Examples of the network include, but are not limited to, the Internet, an intranet, a local area network, a mobile communication network, and a combination thereof.

The transmission module 1006 is configured to receive or transmit data via a network. Specific examples of the network may include a wireless network provided by a communication provider of the computer terminal 1000. In an example, the transmission module 1006 includes a Network Interface Controller (NIC) that can be connected to other network devices through a base station and thereby communicate with the Internet. In an example, the transmission module 1006 can be a Radio Frequency (RF) module, which is used for conducting communications with the Internet wirelessly.

Figure 11:
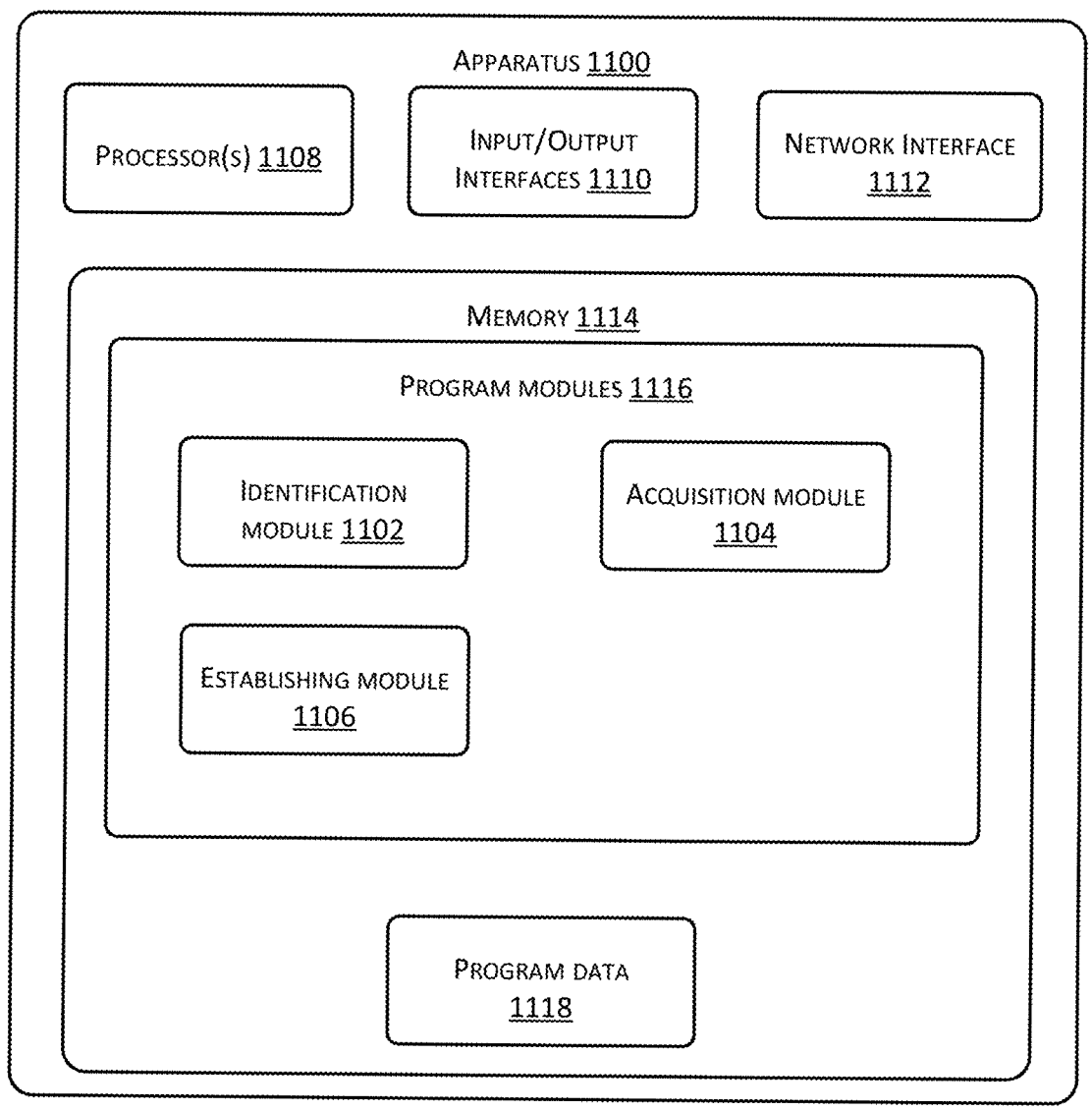
FIG. 11 is a structural block diagram of a voice interactive apparatus in accordance with the embodiments of the present disclosure.

FIG. 11 is a structural block diagram of an interactive apparatus 1100. In implementations, the apparatus 1100 may include one or more computing devices. In implementations, the apparatus 1100 may be a part of one or more computing devices, e.g., implemented or run by the one or more computing devices. In implementations, the one or more computing devices may be located in a single place or distributed among a plurality of network devices over a network. By way of example and not limitation, the apparatus 1100 may include an identification module 1102, an acquisition module 1104, and an establishing module 1106.

The identification module 1102 may be configured to identify whether an object faces the interactive device and is in an utterance state.

The acquisition module 1104 may be configured to obtain voice data of the object upon determining that the object faces the interactive device and is in the utterance state.

The establishing module 1106 may be configured to establish an interaction between the object and the interactive device based on the voice data.

In implementations, the establishing module 1106 may perform a semantic analysis on the voice data, determine whether the voice data is relevant to the interactive device based on a result of the semantic analysis, and establish the interaction between the object and the interactive device in response to confirming the relevancy.

In implementations, the establishing module 1106 may perform a semantic analysis on the voice data, obtain an operational instruction that matches a result of the semantic analysis, and control the interactive device according to the operational instruction.

In implementations, the operational instruction may include, but is not limited to, at least one of a voice response, an interface display, an execution of an action.

In implementations, identifying whether the object faces the interactive device and is in the utterance state may include performing object monitoring within a coverage area of a camera of the interactive device in real time; performing face recognition on a detected object in response to detecting that the object appears in the coverage area; and determining whether the object faces the interactive device and is in the utterance state according to a result of the face recognition.

In implementations, the identification module 1102 may specifically determine whether the monitored object is in an utterance state by performing mouth feature point detection on the detected object.

In implementations, the acquisition module 1104 may specifically obtain the voice data of the object through a microphone array.

In implementations, the apparatus 1100 may further include one or more processors 1108, an input/output (I/O) interface 1110, a network interface 1112, and memory 1114.

The memory 1114 may include a form of computer readable media such as a volatile memory, a random access memory (RAM) and/or a non-volatile memory, for example, a read-only memory (ROM) or a flash RAM. The memory 1114 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1114 may include program modules 1116 and program data 1118. The program modules 1116 may include one or more of the modules as described in the foregoing description and shown in FIG. 11.

Figure 12:
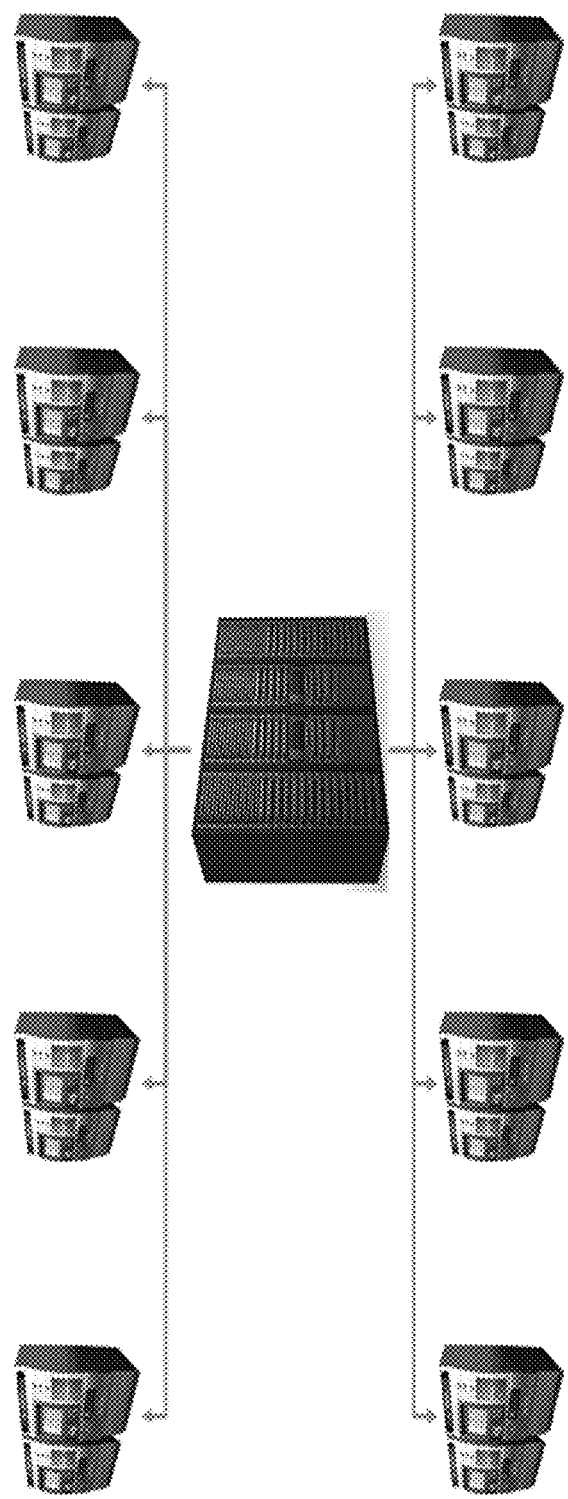
FIG. 12 is a schematic diagram of architecture of a centralized deployment approach in accordance with the embodiments of the present disclosure.
Figure 13:
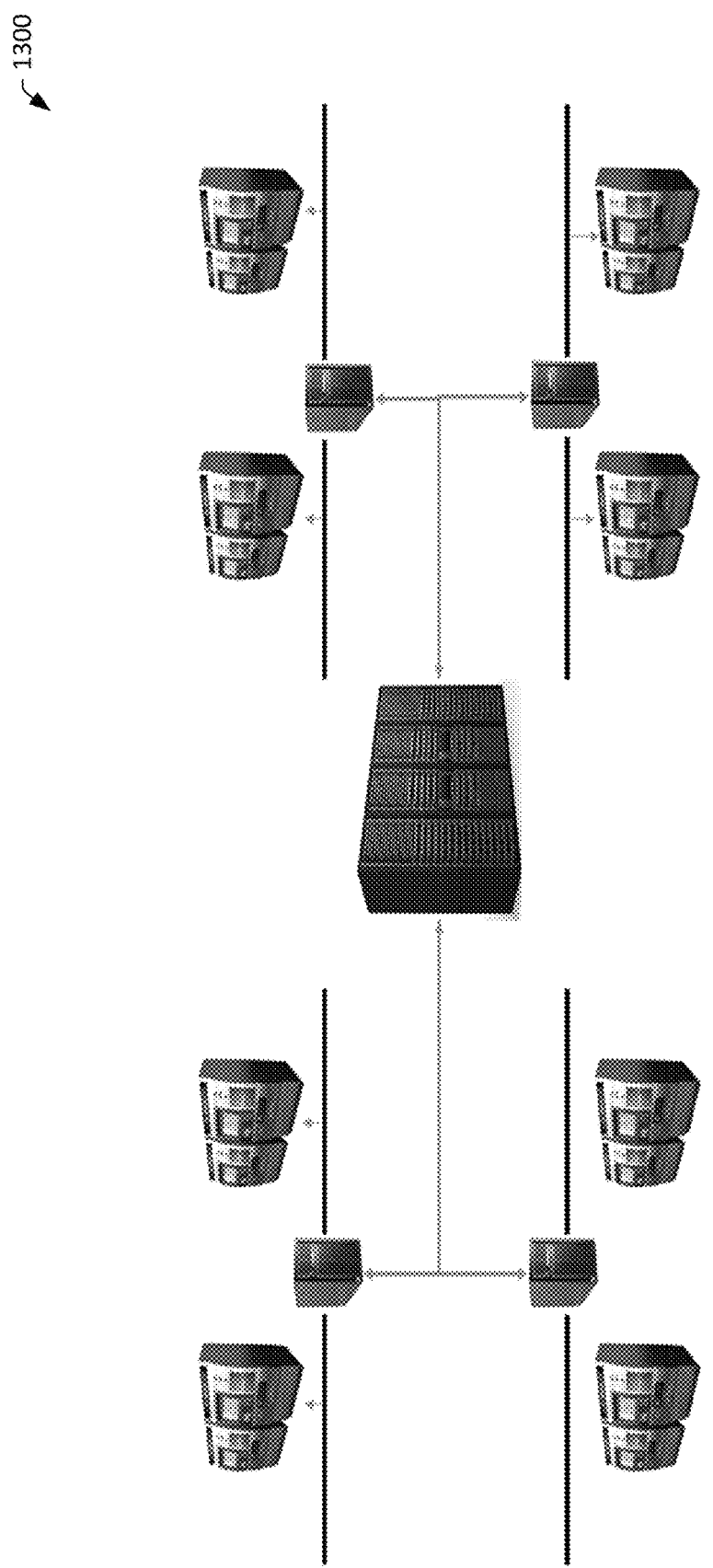
FIG. 13 is a schematic diagram of architecture of a large centralized and small dual active deployment approach in accordance with the embodiments of the present disclosure.

For some large-scale voice interaction scenarios or payment scenarios, two deployment modes are provided in this example. FIG. 12 shows a centralized deployment mode 1200, i.e., multiple human-machine interactive devices are respectively connected to a same processing center. The processing center may be a cloud server, a server cluster, or the like, and the processing center may perform processing on data, or centralized control of the human-machine interactive devices. FIG. 13 shows a large centralized and small dual active deployment mode 1300, in which every two human-machine interactive devices are connected to a small processing center, and the small processing center controls these two human-machine interactive devices connected thereto. All small processing centers are connected to a same large processing center, and a centralized control is performed through the large processing center.

However, it is worth noting that the deployment methods listed above are only an exemplary description. In practical implementations, other deployment methods may also be adopted. For example, a large centralized and triple active deployment mode, etc., and the number of human-computer interactive devices connected to each small processing center being not equal, and the like, can be used as alternative deployment modes, and can be selected according to actual needs, which are not limited in the present disclosure.

The human-computer interactive systems and methods, and the voice denoising methods, etc., that are provided in the present disclosure can be applied to service situations such as court trials, customer service's quality inspections, live video broadcasts, journalist's interviews, meeting minutes, doctor's consultations, etc., and can be applied in customer service machines, smart financial investment consultants, various types of APP, or all kinds of intelligent hardware devices, such as mobile phones, speakers, set-top boxes, vehicle-mounted devices, etc. What needs to be involved are audio recording file recognition, real-time voice recognition, text big data analysis, short voice recognition, speech synthesis, intelligent dialogue, and so on.

The interactive methods and apparatuses provided in the present disclosure determine whether a user has an intent of conducting a voice interaction with a device based on whether an object is facing the device, so that the desire of the user to initiate a voice interaction can be detected in time, thereby triggering voice interactions between a target object and the interactive device. The above-mentioned approach solves the technical problems of existing voice interactions which are prone to unintentional wakeups and need to have wakeup terms set up for an interactive device while the number of wakeup terms for performing wakeups is relatively small. As such, the technical effects of remote voice interactions can be realized without the need of a wakeup term.

Although the present disclosure provides operations of methods as described in the embodiments or flowcharts, more or fewer operations may be included based on routine or non-creative effort. The orders of operations recited in the embodiments are merely ones of many orders of execution of the operations, and do not represent unique orders of execution. Execution may be performed sequentially according to the methods shown in the embodiments or the drawing or in parallel (for example, a parallel processor or multi-thread processing environment), when executed by a device or a client product in practice.

The apparatuses or modules illustrated in the above embodiments may be implemented by a computer chip or an entity, or by a product having certain functions. For the convenience of description, the above apparatuses are divided into various modules in terms of functions for separate descriptions. Functions of the various modules may be implemented in one or more software and/or hardware components when the present disclosure is implemented. Apparently, a module that implements a certain function may also be implemented by a combination of a plurality of sub-modules or subunits.

The methods, apparatuses, or modules described in the present disclosure can be implemented in a form of computer readable program codes. A controller can be implemented in any suitable manner. For example, a controller can take a form of, for example, microprocessors or processors and computer readable media storing computer readable program codes (e.g., software or firmware) executed by the (micro)processors, logic gates, switches, application specific integrated circuits (ASICs), programmable logic controllers, and embedded microcontrollers. Examples of controllers include, but are not limited to, the following microcontrollers: ARC 625D, Atmel AT91SAM, Microchip PIC18F26K20, and Silicone Labs C8051F320. A memory controller can also be implemented as a part of control logic of the memory. It will also be apparent to one skilled in the art that logical programming can be performed completely using operations of the method(s) to cause the controller to implement the same functions in a form of logic gates, switches, application specific integrated circuits, programmable logic controllers, and embedded microprocessors, etc., in addition to implementing the controller in a form of purely computer readable program codes. Therefore, such type of controller can be considered as a hardware component, and an internal apparatus used for implementing various functions can also be regarded as a structure within a hardware component. Alternatively, even an apparatus used for implementing various functions can be considered as a software module and a structure within a hardware component that can implement the method(s).

Some modules in the apparatuses described in the present disclosure may be described in the general context of computer-executable instructions executed by a computer, such as program modules. Generally, program modules include routines, programs, objects, components, data structures, classes, etc., that perform designated tasks or implement designated abstract data types. The present disclosure can also be practiced in a distributed computing environment in which tasks are performed by remote processing devices that are connected through a communication network. In a distributed computing environment, program modules can be located in both local and remote computer storage media including storage devices.

It will be apparent to one skilled in the art from the above description of the embodiments that the present disclosure can be implemented by means of software plus necessary hardware. Based on such understanding, the essence of technical solutions of the present disclosure or the parts that make contributions to the existing technologies may be manifested in a form of a software product, or may be manifested in an implementation process of data migration. The computer software product may be stored in a storage media, such as ROM/RAM, a magnetic disk, an optical disk, etc., and includes a plurality of instructions for causing a computing device (which may be a personal computer, a mobile terminal, a server, or a network device, etc.) to execute the method described in each embodiments or a part of the embodiment.

The various embodiments in the specification are described in a progressive manner, and the same or similar parts between the various embodiments may be referenced to each other. Each embodiment put an emphasis on an area that is different from those of other embodiments. All or part of the present disclosure can be used in a number of general purpose or special purpose computer system environments or configurations, such as a personal computer, a server computer, a handheld device or portable device, a tablet device, a mobile communication terminal, a multiprocessor system, a microprocessor-based system, a programmable electronic device, a network PC, a small-scale computer, a mainframe computer, a distributed computing environment that includes any of the above systems or devices, etc.

Although the present disclosure has been described using the embodiments, one of ordinary skill in the art understands that a number of variations and modifications exist in the present disclosure without departing the spirit of the present disclosure. The appended claims are intended to include these variations and modifications without departing the spirit of the present disclosure.

The present disclosure can be further understood using the following clauses.

Clause 1: An interactive method comprising: identifying whether an object is facing an interactive device and is in an utterance state; obtaining voice data of the object in response to determining that the object is facing the interactive device and is in the utterance state; and establishing an interaction between the object and the interactive device based on the voice data.

Clause 2: The method of Clause 1, wherein establishing the interaction between the object and the interactive device based on the voice data comprises: performing a semantic analysis on the voice data; determining whether the voice data is relevant to the interactive device based on a result of the semantic analysis; and establishing the interaction between the object and the interactive device in response to confirming a relevancy.

Clause 3: The method of Clause 1, wherein establishing the interaction between the object and the interactive device based on the voice data comprises: performing a semantic analysis on the voice data; obtaining an operational instruction that matches a result of the semantic analysis; and controlling the interactive device according to the operational instruction.

Clause 4: The method of Clause 3, wherein the operational instruction comprises at least one of a voice response, an interface display, or an execution of an action.

Clause 5: The method of Clause 1, wherein identifying whether the object is facing the interactive device and is in the utterance state comprises: performing a real-time object monitoring on a coverage area of a camera of the interactive device; in response to detecting an appearance of an object within the coverage area, performing a face recognition on the detected object; and determining whether the object is facing the interactive device and is in the utterance state based on a result of the face recognition.

Clause 6: The method of Clause 5, wherein performing the face recognition on the detected object comprises determining whether the detected object is in the utterance state by detecting mouth feature points from the detected object.

Clause 7: The method of any one of Clauses 1-6, wherein obtaining the voice data of the object comprises obtaining the voice data of the object through a microphone array.

Clause 8: An interactive method comprising: identifying whether an object is facing an interactive device; and establishing an interaction between the object and the interactive device in response to determining that the object is facing the interactive device and a time duration of stay exceeds a preset time duration.

Clause 9: The method of Clause 8, wherein identifying whether the object faces the interactive device comprises: detecting whether an object exists within a preset area of scope; and in response to determining that an object exists within the preset area of scope, determining whether the detected object is facing the interactive device.

Clause 10: The method of Clause 9, wherein detecting whether the object exists within the preset area of scope comprises: detecting whether the object exists within the preset area of scope through a sensor deployed in the preset area of scope; and/or detecting whether the object exists within the preset area of scope through an infrared detector.

Clause 11: The method of Clause 9, wherein determining whether the detected object is facing the interactive device comprises determining whether the detected object is facing the interactive device through face recognition.

Clause 12: The method of Clause 8, wherein: in response to determining that the object is facing the interactive device and the time duration of stay exceeds the preset time duration, the method further comprises: determining whether the object is in an utterance state; obtaining voice data of the object in response to determining that the object is in the utterance state; performing a semantic analysis on the voice data; determining whether the voice data is relevant to the interactive device based on a result of the semantic analysis; and establishing the interaction between the object and the interactive device in response to confirming a relevancy.

Clause 13: An interactive method comprising: identifying whether an object is facing an interactive device; and establishing an interaction between the object and the interactive device in response to determining that the object is facing the interactive device.

Clause 14: An interactive device comprising a camera; a microphone array; and a processor, wherein: the camera is configured to obtain an image, the processor is configured to identify whether an object is facing the interactive device and stays for a time duration that exceeds a preset time duration, the microphone array is configured to obtain audio data of the object in response to determining that the object is facing the interactive device and stays for a time duration that exceeds the preset time duration, and the processor is configured to establish an interaction between the object and the interactive device according to the audio data.

Clause 15: The device of Clause 14, wherein the processor establishing the interaction between the object and the interactive device according to the audio data comprises: performing a semantic analysis on the voice data; determining whether the voice data is relevant to the interactive device based on a result of the semantic analysis; and establishing the interaction between the object and the interactive device in response to confirming a relevancy.

Clause 16: The device of Clause 14, wherein the processor establishing the interaction between the object and the interactive device according to the voice data comprises: performing a semantic analysis on the voice data; obtaining an operational instruction that matches a result of the semantic analysis; and controlling the interactive device according to the operational instruction.

Clause 17: The device of Clause 16, wherein the operational instruction comprises at least one of a voice response, an interface display, or an execution of an action.

Clause 18: The device of Clause 14, wherein: the camera is specifically configured to perform a real-time object monitoring on a coverage area of a camera of the interactive device, in response to detecting an appearance of an object within the coverage area, the processor is specifically configured to perform face recognition on the detected object, and determine whether the object is facing the interactive device and is in the utterance state based on a result of the face recognition.

Clause 19: The device of Clause 18, wherein the processor performing the face recognition on the detected object comprises determining whether the detected object is in the utterance state by detecting mouth feature points from the detected object.

Clause 20: An interactive device comprising a camera: a microphone array: and a processor, wherein: the camera is configured to obtain an image, the processor is configured to identify whether an object is facing the interactive device and stays for a time duration that exceeds a preset time duration, the microphone array is configured to obtain audio data of the object in response to determining that the object is facing the interactive device and stays for a time duration that exceeds the preset time duration, and the processor is configured to establish an interaction between the object and the interactive device according to the audio data.

Clause 21: An interactive device comprising a processor and memory configured to store processor executable instructions, the processor executing the instructions to implement the method of any one of Clauses 1-7.

Clause 22: An interactive device comprising a processor and memory configured to store processor executable instructions, the processor executing the instructions to implement the method of any one of Clauses 8-12.

Clause 23: A computer readable storage media having computer instructions stored thereon, the instructions that, when executed, implement the method of any one of Clauses 1-7.

Clause 24: A computer readable storage media having computer instructions stored thereon, the instructions that, when executed, implement the method of any one of Clauses 8-12.

What is claimed is:
1. A method implemented by an interactive device, the method comprising:
   determining, by a camera of the interactive device, whether a plurality of objects is facing the interactive device and a time duration of stay exceeds a preset time duration;
   in response to determining that the plurality of objects is facing the interactive device and the time duration of stay exceeds the preset time duration:

initiating a voice interaction between a closest object of the plurality of objects and the interactive device by actively providing an initial voice inquiry from the interactive device to the closest object, the closest object being at a shortest linear distance from the interactive device among the plurality of objects;

in response to the initial voice inquiry, receiving, by a microphone array of the interactive device, voice data of the closest object;

performing, by the microphone array, directional denoising of the voice data based on information obtained by the camera and the microphone array including enhancing the voice data in a direction of the closest object while suppressing noises in directions different from the direction of the closest object; and establishing the voice interaction between the closest object and the interactive device based on the voice data comprising:

performing a semantic analysis on the voice data;

determining whether the voice data is relevant to the interactive device based on a result of the semantic analysis; and establishing the voice interaction between the closest object and the interactive device in response to determining that the voice data is relevant to the interactive device.

2. The method of claim 1, wherein establishing the voice interaction between the closest object and the interactive device based on the voice data further comprising:

performing a semantic analysis on the voice data;

obtaining an operational instruction that matches a result of the semantic analysis; and controlling the interactive device according to the operational instruction.

3. The method of claim 2, wherein the operational instruction comprises at least one of a voice response, an interface display, or an execution of an action.

4. The method of claim 1, wherein determining whether the plurality of objects is facing the interactive device comprises:

detecting mouth feature points from the plurality of objects;

performing a real-time object monitoring on a coverage area of the camera of the interactive device;

in response to detecting an appearance of the plurality of objects within the coverage area, performing a face recognition on each object of the plurality of objects and determining whether a corresponding object is facing the interactive device and is in an utterance state based on the mouth feature points from the corresponding object.

5. One or more computer readable media storing executable instructions that, when executed one or more processors, cause the one or more processors to perform acts comprising:

determining, by a camera of an interactive device, whether a plurality of objects is facing the interactive device;

in response to determining that the plurality of objects is facing the interactive device and a time duration of stay of the plurality of objects exceeds a preset time duration:

initiating a voice interaction between a closest object of the plurality of objects and the interactive device by actively providing an initial voice inquiry from the interactive device to the closest object, the closest object being at a shortest linear distance from the interactive device among the plurality of objects;

in response to the initial voice inquiry, receiving voice data of the closest object through a microphone array of the interactive device;

performing, by the microphone array, directional denoising of the voice data based on information obtained by the camera and the microphone array including enhancing the voice data in a direction of the closest object while suppressing noises in directions different from the direction of the closest object;

establishing the voice interaction between the closest object and the interactive device;

performing a semantic analysis on the voice data;

determining whether the voice data is relevant to the interactive device based on a result of the semantic analysis; and establishing the voice interaction between the closest object and the interactive device in response to determining that the voice data is relevant to the interactive device.

6. The one or more computer readable media of claim 5, wherein determining whether the plurality of objects is facing the interactive device comprises:

detecting whether the plurality of objects exists within a preset area of scope; and in response to determining that the plurality of objects exists within the preset area of scope, determining whether the plurality if objects is facing the interactive device.

7. The one or more computer readable media of claim 6, wherein detecting whether the plurality of objects exists within the preset area of scope comprises at least one of:

detecting whether the plurality of objects exists within the preset area of scope through a sensor deployed in the preset area of scope; or detecting whether the plurality of objects exists within the preset area of scope through an infrared detector.

8. The one or more computer readable media of claim 6, wherein determining whether the plurality of objects is facing the interactive device comprises determining whether the plurality of objects is facing the interactive device through face recognition.

9. The one or more computer readable media of claim 5, the acts further comprising:

determining whether each object of the plurality of objects is in an utterance state in response to determining that the plurality of objects is facing the interactive device and the time duration of stay exceeds the preset time duration; and wherein obtaining the voice data of the closest object includes obtaining the voice data of the closest object in response to determining that the closest object is in the utterance state.

10. A device comprising:

a camera configured to obtain an image;

one or more processors configured to:

determine whether a plurality of objects is facing the interactive device and stays for a time duration that exceeds a preset time duration, and in response to determining that the plurality of objects is facing the interactive device and stays for the time duration that exceeds the preset time duration, initiate a voice interaction between a closest object of the plurality of objects and the interactive device by actively providing an initial voice inquiry from the interactive device to the closest object, the closest object being at a shortest linear distance from the interactive device among the plurality of objects; and a microphone array configured to:
- receive voice data of the closest object in response to the initial voice inquiry, and
- perform directional de-noising of the voice data based on information obtained by the camera and the microphone array including enhancing the voice data in a direction of the closest object while suppressing noises in directions different from the direction of the closest object, wherein the one or more processors are further configured to establish the voice interaction between the closest object and the interactive device according to the voice data by:
- performing a semantic analysis on the voice data;
- obtaining an operational instruction that matches a result of the semantic analysis;
- controlling the interactive device according to the operational instruction;
- determining whether the voice data is relevant to the interactive device based on the result of the semantic analysis; and
- establishing the voice interaction between the closest object and the interactive device in response to confirming a relevancy.

11. The device of claim 10, wherein the operational instruction comprises at least one of a voice response, an interface display, or an execution of an action.

12. The device of claim 10, wherein the camera is further configured to perform a real-time object monitoring on a coverage area of a camera of the interactive device.

13. The device of claim 12, wherein the one or more processors are further configured to:
- perform face recognition on each object of the plurality of objects in response to detecting an appearances of the corresponding object within the coverage area; and
- determine whether the corresponding objects is facing the interactive device and is in an utterance state based on a result of the face recognition.

14. The device of claim 13, wherein performing the face recognition on the corresponding object comprises determining whether the corresponding object is in the utterance state by detecting mouth feature points from the corresponding object.

15. The method of claim 1, wherein the information obtained by the camera and the microphone array includes a position of each object of the plurality of objects.

16. The one or more computer readable media of claim 5, wherein the information obtained by the camera and the microphone array includes a position of each object of the plurality of objects.

17. The one or more computer readable media of claim 9, wherein determining whether each object of the plurality of objects is in the utterance state comprises detecting mouth feature points from a corresponding object.

* * * * *